United States Patent
Shibata et al.

(10) Patent No.: US 10,181,625 B2
(45) Date of Patent: Jan. 15, 2019

(54) AIR BATTERY AND AIR BATTERY STACK USING SAME

(71) Applicant: NISSAN MOTOR CO., LTD., Yokohama-shi, Kanagawa (JP)

(72) Inventors: Itaru Shibata, Kamakura (JP); Atsushi Miyazawa, Yokohama (JP); Yoshiko Tsukada, Yokohama (JP); Naoya Matsuoka, Yokohama (JP); Mori Nagayama, Yokohama (JP)

(73) Assignee: NISSAN MOTOR CO., LTD., Yokohama-Shi (JP)

( * ) Notice: Subject to any disclaimer, the term of this patent is extended or adjusted under 35 U.S.C. 154(b) by 0 days.

(21) Appl. No.: 14/419,562

(22) PCT Filed: Jul. 29, 2013

(86) PCT No.: PCT/JP2013/070435
§ 371 (c)(1),
(2) Date: Feb. 4, 2015

(87) PCT Pub. No.: WO2014/024713
PCT Pub. Date: Feb. 13, 2014

(65) Prior Publication Data
US 2015/0214588 A1    Jul. 30, 2015

(30) Foreign Application Priority Data

Aug. 6, 2012   (JP) ................................. 2012-173705

(51) Int. Cl.
| | | |
|---|---|---|
| *H01M 12/08* | (2006.01) | |
| *H01M 2/12* | (2006.01) | |
| *H01M 12/06* | (2006.01) | |
| *H01M 4/86* | (2006.01) | |
| *H01M 2/08* | (2006.01) | |

(52) U.S. Cl.
CPC ............. *H01M 12/08* (2013.01); *H01M 2/12* (2013.01); *H01M 2/1205* (2013.01); *H01M 2/1223* (2013.01); *H01M 4/8605* (2013.01); *H01M 12/065* (2013.01); *H01M 2/08* (2013.01); *H01M 2004/8689* (2013.01)

(58) Field of Classification Search
None
See application file for complete search history.

(56) References Cited

U.S. PATENT DOCUMENTS

| | | | | |
|---|---|---|---|---|
| 3,902,922 | A | * | 9/1975 | Kalnoki-Kis ........... H01M 6/12 429/162 |
| 5,356,729 | A | | 10/1994 | Pedicini |
| 5,569,551 | A | | 10/1996 | Pedicini et al. |
| 6,461,765 | B1 | | 10/2002 | Witzigreuter |
| 2004/0197644 | A1 | | 10/2004 | Buckle |
| 2010/0173206 | A1 | | 7/2010 | Wang Chen |
| 2012/0202126 | A1 | * | 8/2012 | Neburchilov ........ B01J 31/1815 429/405 |

FOREIGN PATENT DOCUMENTS

| | | |
|---|---|---|
| CN | 101567477 A | 10/2009 |
| JP | 47-027354 A | 10/1972 |
| JP | 51-138838 A | 11/1976 |
| JP | 58-050614 Y2 | 11/1983 |
| JP | 61-66865 U | 5/1986 |
| JP | 2002-305040 A | 10/2002 |
| JP | 2004-288571 A | 10/2004 |
| JP | 20051664   * | 6/2005 |
| JP | 2013-152894 A | 8/2013 |

OTHER PUBLICATIONS

JP 20051664—Translation.*

* cited by examiner

*Primary Examiner* — Ladan Mohaddes
(74) *Attorney, Agent, or Firm* — Foley & Lardner LLP

(57) ABSTRACT

The present invention is an air battery B1 in which a cathode assembly 40, including a porous cathode layer 41, and an anode assembly 30 are disposed on mutually opposite sides of an electrolytic solution layer β. It includes an electrically conductive cathode support plate 42 that supports the porous cathode layer 41 and includes a ventilation area, wherein the porous cathode layer 41 covers the ventilation area and further extends to a non-ventilation area outside the ventilation area, and includes a dense portion 41a at an outer edge part facing the non-ventilation area.

6 Claims, 5 Drawing Sheets

(A)

(B)

AIR BATTERY AND AIR BATTERY STACK USING SAME

TECHNICAL FIELD

The present invention relates to an air battery (cell) in which a cathode assembly, including a porous cathode layer, and an anode assembly are disposed on mutually opposite sides of an electrolytic solution layer, and to an air battery (cell) stack using the same.

BACKGROUND ART

An air battery of this kind is disclosed in, for example, Patent Document 1 where it is called an "aqueous metal-air battery". The aqueous metal-air battery disclosed in Patent Document 1 includes a cathode, a separator and a gel metal anode material, which are enclosed in an outer container made of a laminate sheet including a thermal adhesive resin layer. The aqueous metal-air battery is characterized in that the volume ratio of the anode material in the battery is within the range from 40% to 90%.

CITATION LIST

Patent Literature

Patent Document 1: JP2004-288571A

SUMMARY OF INVENTION

Technical Problem

In typical air batteries in which electrolytic solution is used in a cathode in addition to a porous membrane containing a conductive carbon material support and an oxygen-reductive catalyst mixed therein, such as the aqueous metal-air battery disclosed in Patent Document 1, it is essential to prevent the electrolytic solution from leaking from the cathode or the surroundings.

Further, the cathode is mechanically weak because it has a film thickness of tens to hundreds of micrometers and is also porous. Accordingly, the cathode, especially the weak edge part of a cathode layer, may be damaged by a current collector that presses the cathode.

To cope with the problems, it is an object of the present invention to provide an air battery that can prevent electrolytic solution from leaking and protect a porous cathode layer, and an air battery stack using the same.

Solution to Problem

The present invention for solving the above-described problems is an air battery including: a cathode assembly, including a porous cathode layer, and an anode assembly that are disposed on mutually opposite sides of an electrolytic solution layer; and an electrically conductive cathode support plate that supports the porous cathode layer and includes an ventilation area, wherein the porous cathode layer covers the ventilation area and further extends to a non-ventilation area outside the ventilation area and includes a dense portion at an outer edge part facing the non-ventilation area.

In the above configuration, the electrically conductive cathode support plate supports the porous cathode layer, and the dense portion is formed at the outer edge part of the porous cathode layer. Therefore, it is possible to prevent electrolytic solution from leaking, and to protect the porous cathode layer.

Advantageous Effects of Invention

The present invention can prevent the electrolytic solution from leaking and protect the porous cathode layer.

DESCRIPTION OF EMBODIMENTS

Figure 1:
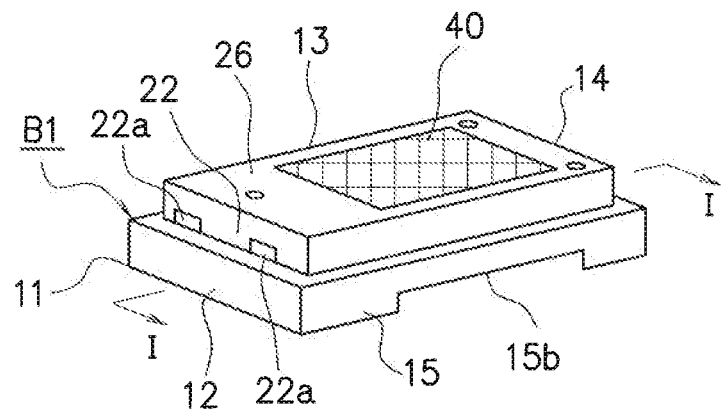
FIG. 1 is a perspective view of an air battery unit cell according to an embodiment of the present invention.
Figure 2:
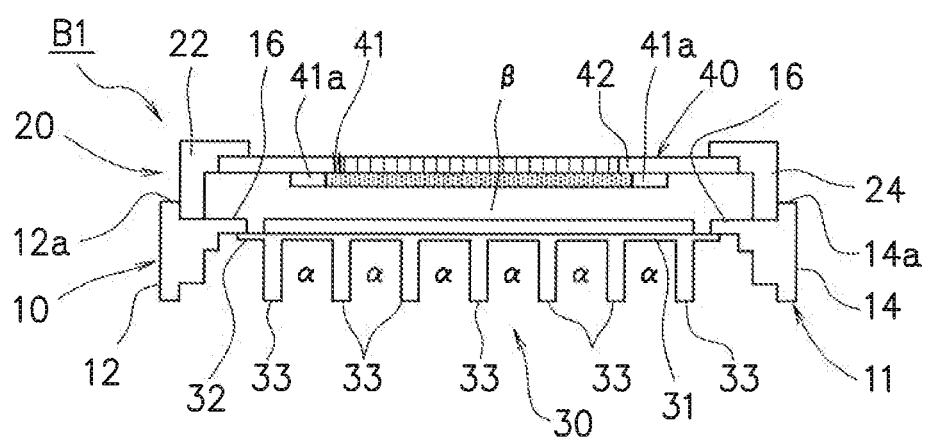
FIG. 2 is a cross sectional view taken along the line I-I in FIG. 1.
Figure 3:
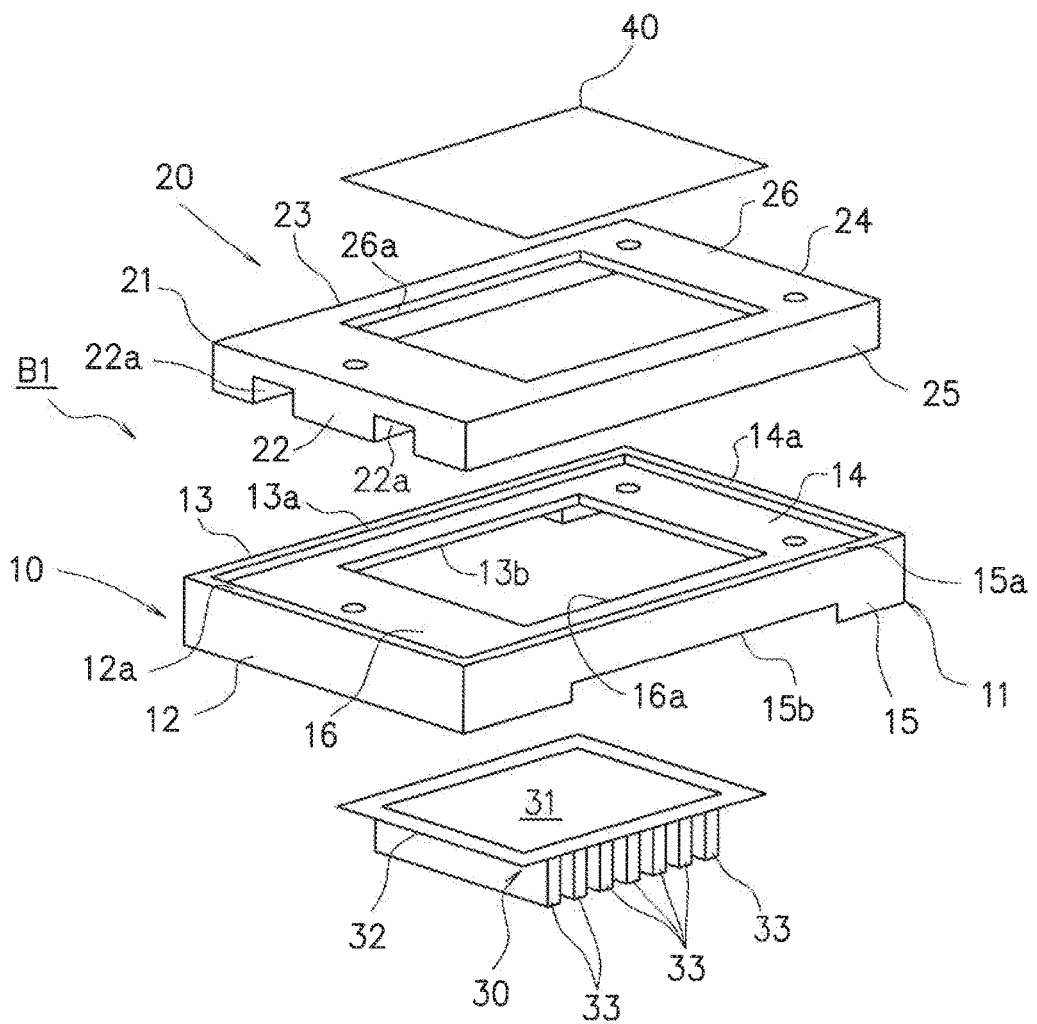
FIG. 3 is an exploded perspective view of the air battery unit cell according to the embodiment.
Figure 4:
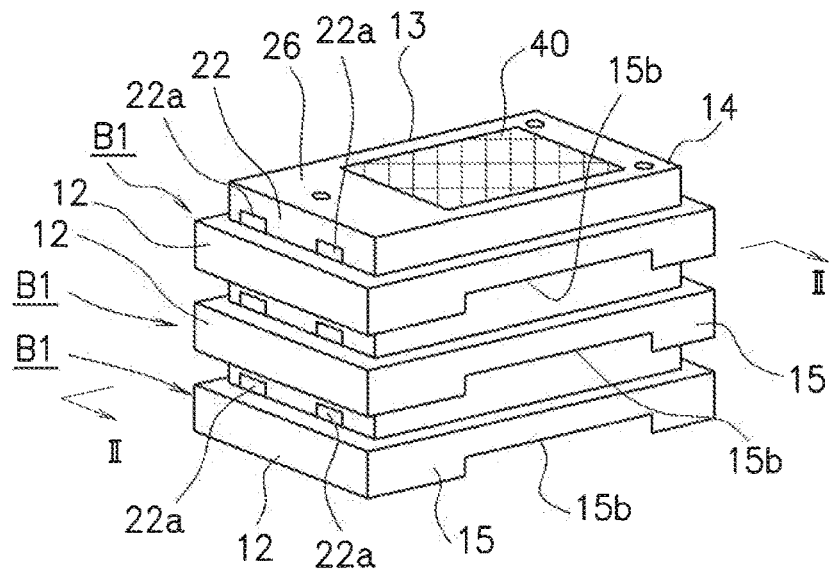
FIG. 4 is a perspective view of an air battery stack in which three air batteries of the embodiment are vertically stacked.
Figure 5:
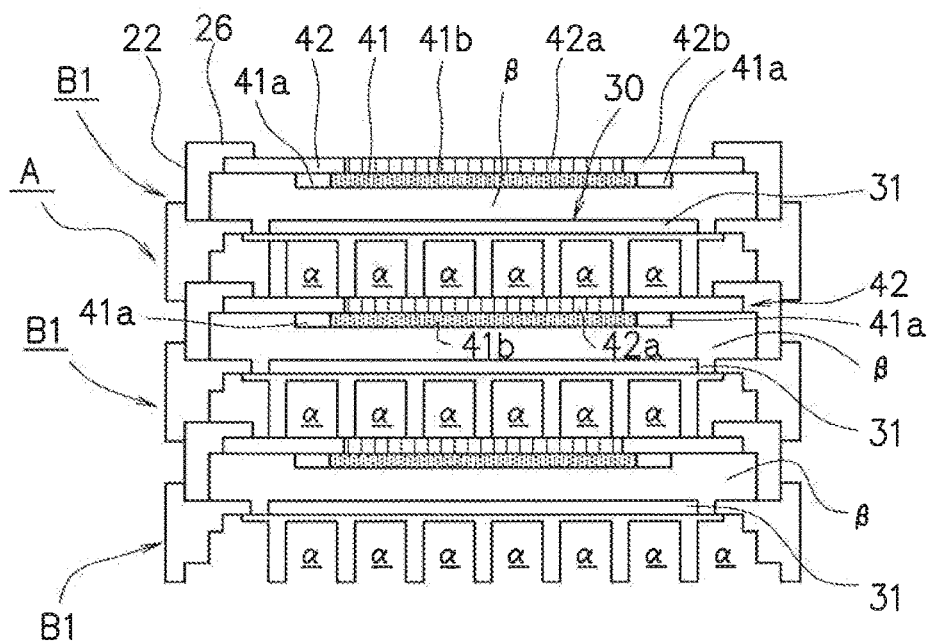
FIG. 5 is a cross sectional view taken along the line II-II of FIG. 4.

Hereinafter, embodiments of the present invention will be described with reference to the drawings. FIG. 1 is a perspective view of an air battery unit cell according to an embodiment of the present invention, FIG. 2 is a cross sectional view taken along the line I-I in FIG. 1, and FIG. 3 is an exploded perspective view of the air battery unit cell according to the embodiment. Further, FIG. 4 is a perspective view of an air battery stack in which three air batteries of the embodiment are vertically stacked, and FIG. 5 is a cross sectional view taken along the line II-II of FIG. 4.

The air battery B1 according to an embodiment includes an anode separable body 10 and a cathode separable body 20 that are coupled with each other. The anode separable body 10 includes a frame 11 and an anode assembly 30 disposed in the frame 11.

The frame 11 is made of an electrically insulating synthetic resin such as polypropylene. The frame 11 is constituted by side plates 12 to 15 that have a required height and are formed in a square frame shape in a plan view and an attachment piece 16 for fixing the anode assembly 30, which are integrally formed in one piece.

The attachment piece 16 is formed near end faces 12a to 15a at one side (upper end faces in the figure) of the side plates 12 to 15. The attachment piece 16 defines an opening 16a having a rectangular shape in a plan view in the frame 11 so that the anode assembly 30 attached therein is exposed from the opening 16a.

On the side plates 13 and 15, horizontally oblong air ventilation openings 13b and 15b are formed opposite to each other.

In the embodiment, the air ventilation openings 13b and 15b have a width approximately corresponding to the length between the outermost current collectors 33, 33 of the current collectors 33 . . . described below.

As illustrated in FIG. 2 and FIG. 3, the anode assembly 30 includes an anode 31, an anode support plate 32 and a current collector 33, which are integrally laminated to each other.

The anode 31 is made of a metal material selected from aluminum, magnesium and the alloy thereof, and is eroded as a result of an electrochemical reaction with an electrolytic solution (anode reaction) so as to allow electrons to be extracted to the outside through the current collectors 33.

The anode support plate 32 is constituted of a plate of copper, nickel or the alloy thereof or stainless steel that has a certain thickness and is formed in a square shape in a plan view. The anode 31 is fixedly mounted on one side (upper face in the figure) of the anode support plate 32. That is, the anode 31 is fixed on the attachment piece 16 via the anode support plate 32.

The anode 31 and the anode support plate 32 are electrically and mechanically joined to each other by means of cladding, electric welding, laser welding, or the like.

The current collectors 33 provide an electrical connection to the anode assembly 30 and also form air channels. The current collectors 33 are fixedly arranged on the other side (lower face in the figure) of the anode support plate 32 at regular intervals parallel to the air ventilation openings 13b and 15b.

The current collectors 33 are electrically and mechanically joined to the anode support plate 32 by means of electric welding, laser welding or the like.

In the embodiment, the plurality of current collectors 33 are arranged on the other side (lower face in the figure) of the anode support plate 32 at regular intervals parallel to each other so that the air channels a are formed between them.

The current collectors 33 may be formed in any other shape known in the art as long as the air flow resistance is low.

The cathode separable body 20 includes a frame 21 and a cathode assembly 40 disposed in the frame 21.

The frame 21 is made of an electrically insulating synthetic resin such as polypropylene. The frame 21 includes side plates 22 to 25 that has a required height and are formed in a square frame shape in a plan view and an attachment piece 26 for fixing the cathode assembly 40, which are integrally formed in one piece.

On the side plate 22, two electrolytic solution injection openings 22a, 22a for injecting electrolytic solution from the outside are formed through the side plate 22 with a certain distance from each other.

The attachment piece 26 is formed on end faces at one side (upper faces in the figure) of the side plates 22 to 25. The attachment piece 26 defines an opening 26a having a square shape in a plan view so that the cathode assembly 40 attached therein is exposed from the opening 26a.

As illustrated in FIG. 2 and FIG. 5, the cathode assembly 40 includes a porous cathode layer 41 and a cathode support plate 42.

The porous cathode layer 41 is constituted of a film that is formed by drying a paste of active charcoal, PTFE and silver fine particles as a catalyst mixed in the proportion of 80:15:5. In the embodiment, the porous cathode layer 41 is water-repellent, which enables water-repellent film and the like to be omitted.

In the embodiment, the porous cathode layer 41 covers the ventilation area described below and further extends to a non-ventilation area outside the ventilation area, and has a dense portion 41a at an outer edge part facing the non-ventilation area.

The dense portion 41a is continuously formed at the outer edge part of the porous cathode layer 41 facing the non-ventilation area such that it fringes the porous cathode layer 41.

The dense portion 41 a is not necessarily continuously formed at the outer edge part of the porous cathode layer 41, but may be formed intermittently at regular intervals.

The cathode support plate 42 is made of stainless steel (SUS 304) and is formed in a rectangular shape in a plan view. In the center part thereof, a plurality of through holes having a diameter $\phi$ of 0.2 mm are formed at a density of 30 holes/cm$^2$ by means of chemical etching.

In the embodiment, the area where the "plurality of through holes" are formed is referred to as a "ventilation area 42a", and the other area is referred to as a "non-ventilation area 42b".

The dense portion 41 a is formed by pressing the porous cathode layer 41 against the cathode support plate 42 while heating them at about 150° C. so as to bond them to each other and then further pressing and heating only the part where the dense portion 41 is formed at 250° C.

By coupling the above-described anode separable body 10 and the cathode separable body 20 to each other, an electrolytic solution layer β is defined between the anode separable body 10 and the cathode separable body 20. In other words, the anode separable body 10 and the cathode separable body 20 are disposed on mutually opposite sides of the electrolytic solution layer β.

FIG. 4 is a perspective view of an air battery stack in which three air batteries of the embodiment are stacked vertically, and FIG. 5 is a cross sectional view taken along the line II-II in FIG. 4.

An air battery stack A according to an embodiment of the present invention is composed of three above-described air batteries B1 . . . that are stacked vertically.

When two adjacent air batteries B1 and B1 are mated with each other, the upper ends of the side plates 12 to 15 of the lower air battery B1 fit in the lower ends of the side plates 22 to 25 of the upper air battery B1, so that they are firmly stacked up. Further, the current collectors 33 of the anode assembly 30 of the upper air battery B1 abut the cathode support plate 42 of the cathode assembly 40 of the lower air battery B1 at the lower end faces the current collectors 33 in the figure.

This ensures that the current collectors 33 have an electrical connection and are joined, and also makes it easy to assemble the air battery stack A in which stacked air batteries B1 are connected in series.

The cathode assembly 40 manufactured as described above was used to manufacture the air battery B1, and an electrolytic solution of 10N-KOH aqueous solution was injected into the electrolytic solution layer β. Even after it was left to stand for 1 month, no electrolytic solution leak was observed.

With the air battery B1 or the air battery stack A with the above-described configuration, the following advantageous effects can be achieved.

Electrolytic solution leaking can be prevented while the mechanical strength of the porous cathode layer can also be improved.

The air battery B1 can be assembled easily as it has a structure that couples the anode separable body 10, including the anode assembly 30, with the cathode separable body 20, including the cathode assembly 40.

Figure 6:
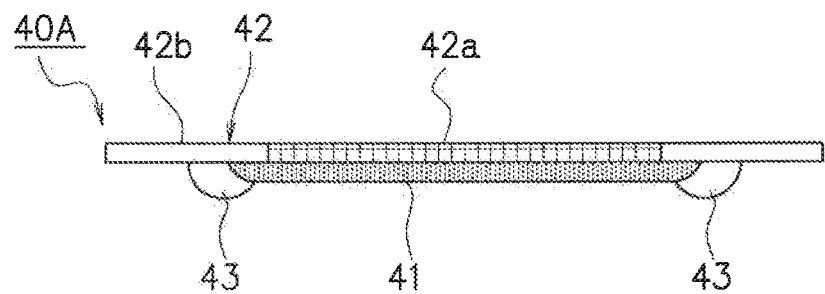
FIG. 6 is a cross sectional view of a cathode assembly according to a first variation.
Figure 7:
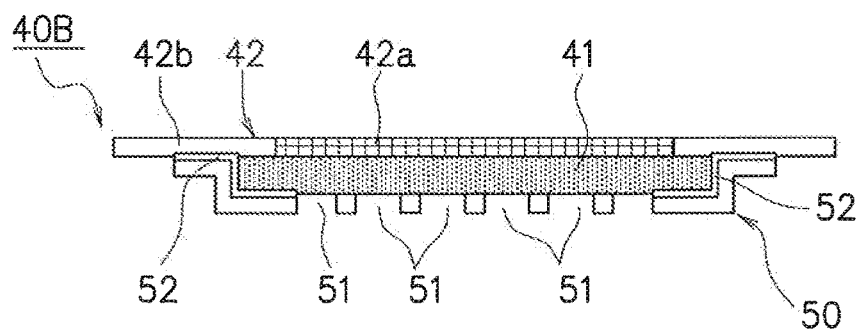
FIG. 7 is a cross sectional view of a cathode assembly according to a second variation.
Figure 8:
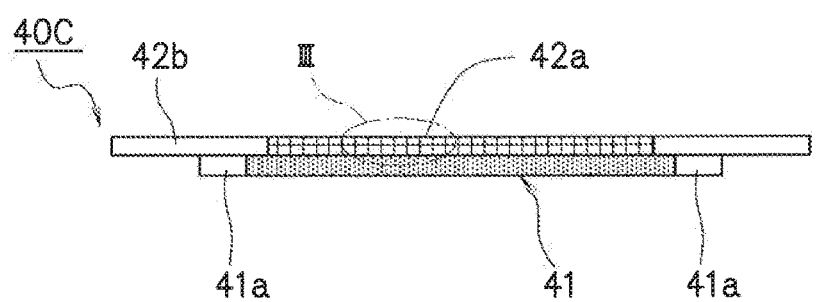
FIG. 8 is (A) a cross-sectional view of a cathode assembly according to a third variation, and (B) an enlarged view of the part surrounded by the line III in (A).
Figure 8:
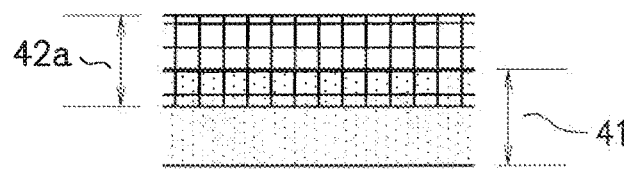

FIG. 6 to FIG. 8 (A) are cross sectional views of first to third variations of the cathode assembly, and FIG. 8 (B) is an enlarged view of the part surrounded by the line III in FIG. 8 (A). The same reference signs are denoted to the same components as those described in the above embodiment, and the description thereof is omitted.

In a cathode assembly 40A according to the first variation in FIG. 6, a non-water permeable adhesive layer 43 is continuously formed on an outer peripheral part facing the outer edge part of a porous cathode layer 41.

In this embodiment, the cathode assembly 40A is fixed on an electrically conductive cathode support plate 42 by means of the adhesive layer 43. This structure does not require other members for fixing the cathode assembly 40A on the cathode support plate 42.

The adhesive layer 43 is formed by applying it on the outer edge part of the porous cathode layer 41 using a dispenser (not shown).

By adjusting the width of the applied adhesive, the adhesive may be applied over the cathode support plate 42, the outer edge parts of the porous cathode 41 and the upper side of the porous cathode layer 41.

The adhesive thus applied can bond the end part of the porous cathode layer 41 to the cathode support plate 42 and can also protect the outer edge part of the porous cathode layer 41.

The adhesive may be a modified acrylic silicone adhesive that cures by a reaction with moisture in the air.

Adhesives that can be used are not limited to the modified acrylic silicone adhesives, but also include epoxy-based adhesive and silicone-based adhesives.

The cathode assembly 40A manufactured as described above was used to manufacture an air battery cell unit B1, and an electrolytic solution of 10N-KOH aqueous solution was injected into the electrolytic solution layer β. Even after it was left to stand for 1 month, no electrolytic solution leak was observed.

In a cathode assembly 40B according to the second variation in FIG. 7, a cathode protection member 50 is provided to cover and protect a porous cathode layer 41. The cathode protection member 50, which is an electrically insulating member, is formed in such a size that it fully covers the porous cathode layer 41 and further abuts a non-ventilation area 42b.

The cathode protection member 50 bonds an end part of the porous cathode layer 41 on the cathode support plate 42 by means of an adhesive 52 and also presses the surface of the porous cathode 41 against the cathode support plate 42.

In the pressing part, through holes 51 are formed so that the porous cathode layer 41 can be in contact with the electrolytic solution in an electrolytic solution layer β.

In this embodiment, the cathode protection member 50 is made of a polypropylene resin in order to ensure that it has a good electrical insulating property. However, it may also be made of an epoxy resin or an acrylic resin.

The cathode assembly 40B manufactured as described above was used to manufacture an air battery cell unit B1, and an electrolytic solution of 10N-KOH aqueous solution was injected into the electrolytic solution layer β. Even after it was left to stand for 2 months, no electrolytic solution leak was observed.

In a cathode assembly 40C according to the third variation of FIG. 8 (A) and (B), a porous cathode layer 41 is at least partly embedded in a ventilation area 42a in addition to the configuration of the cathode assembly 40 in FIG. 5.

To mount the porous cathode layer 41 on the cathode support plate 42, a cathode layer paste is applied on the ventilation area 42a of the cathode support plate 42 beforehand by means of screen printing, and then a cathode layer film as described in FIG. 1 is pressed against the cathode support plate 41 while both are heated at approximately 150° C. so as to form a bond. Thereafter, only a dense portion 41a is further pressed and heated at 250° C.

Since the porous cathode layer 41 is partly embedded in the ventilation area 42a of the cathode support plate 42 beforehand, it is possible to improve the adhesion of the porous cathode layer 41 with the cathode support plate 42.

The cathode assembly 40C manufactured as described above was used to manufacture an air battery cell unit B1, and an electrolytic solution of 10N-KOH aqueous solution was injected into the electrolytic solution layer β. Even after it was left to stand for 2 months no electrolytic solution leak was observed.

The present invention is not limited to the above-described embodiments, and the following modification can be made.

In the above-described embodiment, the cathode assembly 40A is fixed on the cathode support plate 42 by means of the adhesive layer 43. However, the fixing means is not limited to the adhesive layer 43, and the cathode assembly 40A may be fixed on the cathode support plate 42 by a different member.

REFERENCE SIGNS LIST 30 anode assembly
40, 40A, 40B, 40C cathode assembly
41 porous cathode layer
41a dense portion
42 cathode support plate
42a ventilation area
42b non-ventilation area
43 adhesive layer
50 cathode protection member
β electrolytic solution layer

The invention claimed is:
1. An air battery, comprising:
a cathode assembly and an anode assembly that are disposed on mutually opposite sides of an electrolytic solution layer, wherein the cathode assembly comprises a porous cathode layer and an electrically conductive cathode support plate that supports the porous cathode layer,
the cathode support plate comprises a ventilation area in a center part of the cathode support plate and a non-ventilation area outside the ventilation area,
the porous cathode layer covers the ventilation area of the cathode support plate and further comprises a dense portion integrally formed in an outer edge part facing the non-ventilation area,
the cathode support plate includes a frame that fixes a periphery of the cathode support plate, the anode assembly includes a frame that fixes a periphery of the anode assembly, and the electrolytic solution layer that includes an electrolytic solution is formed between the support plate with the frame and the anode assembly with the frame, and
the dense portion of the porous cathode layer is bonded to a surface of the non-ventilation area of the cathode support plate adjacent the electrolytic solution layer that includes the electrolytic solution.
2. The air battery according to claim 1, wherein the porous cathode layer is at least partly embedded in the ventilation area.
3. An air battery stack, comprising a plurality of the air battery according to claim 1 that are stacked up.

4. The air battery according to claim 1, wherein the porous cathode layer is constituted of a water-repellent porous layer.

5. The air battery according to claim 1, wherein the porous cathode layer is constituted of a film that is composed of active charcoal, PTFE and silver fine particles as a catalyst which are mixed in predetermined proportion.

6. The air battery according to claim 1, wherein the cathode support plate is made of stainless steel.

* * * * *